United States Patent [19]

Uzuki

[11] Patent Number: 4,964,005
[45] Date of Patent: Oct. 16, 1990

[54] INFORMATION RECORDING/REPRODUCING APPARATUS HAVING SWINGATE LEVERS FOR OPENING AND CLOSING SHUTTER OF CARTRIDGE IN RESPONSE TO INSERTION AND EJECTION OF CARTRIDGE

[75] Inventor: Kazuo Uzuki, Yokohama, Japan
[73] Assignee: Canon Kabushiki Kaisha, Tokyo, Japan
[21] Appl. No.: 139,924
[22] Filed: Dec. 31, 1987

[30] Foreign Application Priority Data

Jan. 19, 1987 [JP]  Japan ................................. 62-8113
Jan. 19, 1987 [JP]  Japan ................................. 62-8114

[51] Int. Cl.$^5$ ..................... G11B 5/012; G11B 17/04
[52] U.S. Cl. ................................ 360/99.06; 369/772
[58] Field of Search ................... 360/97, 99; 369/75.1, 369/75.2, 77.1, 77.2

[56] References Cited

U.S. PATENT DOCUMENTS

| | | | |
|---|---|---|---|
| 4,622,607 | 11/1986 | Smith, II | 360/97 |
| 4,736,356 | 4/1988 | Konshak | 360/99 X |
| 4,745,500 | 5/1988 | Davis | 360/97 |
| 4,811,137 | 3/1989 | Muto et al. | 360/99.06 |

FOREIGN PATENT DOCUMENTS 0102370 6/1983 Japan ................................. 369/77.2

58-101355 7/1983 Japan.

Primary Examiner—David J. Severin
Attorney, Agent, or Firm—Fitzpatrick, Cella Harper & Scinto

[57] ABSTRACT

An image recording/reproducing apparatus is designed to be loaded with a cartridge accommodating a recording medium such as an optical or magnetic disk. The cartridge has a shutter which is automatically opened when the cartridge is mounted on the apparatus so as to enable the recording/reproducing portion of the apparatus to access the recording medium for the purpose of recording and/or reproduction. The apparatus includes a mechanism for automatically opening and closing the shutter in response to inserting and ejecting the cartridge. The mechanism includes a pair of swingable levers or shutter arms arranged symmetrically with respect to a line along which the center of the cartridge is moved during insertion. The free end of one of the swingable levers is adapted to be engaged by an engaging portion provided on the shutter of the cartridge so as to urge the shutter in the opening direction when the cartridge is inserted. When the cartridge is inserted in an inverted orientation, the engaging portion of the shutter is brought into engagement with the free end of the other swingable shutter lever so as to be urged in the opening direction which is opposite to the first-mentioned opening direction.

5 Claims, 6 Drawing Sheets

INFORMATION RECORDING/REPRODUCING APPARATUS HAVING SWINGATE LEVERS FOR OPENING AND CLOSING SHUTTER OF CARTRIDGE IN RESPONSE TO INSERTION AND EJECTION OF CARTRIDGE

BACKGROUND OF THE INVENTION

1. Field of the Invention

The present invention relates to an information recording/reproducing apparatus which is designed to be loaded with a cartridge having an information recording medium such as an optical disk and an opto-magnetic disk, and to conduct recording and/or reproduction of information in and from such a recording medium. More particularly, the invention is concerned with an information recording/reproducing apparatus having a mechanism which acts to open and close a shutter of a cartridge in response to insertion and ejection of the cartridge.

2. Description of Related Art

One typical example of conventional disk cartridges will be explained hereinunder with reference to FIG. 1A which is a schematic perspective view of the disk cartridge in an inoperative state with its shutter 158 held in a closed position, as well as to FIGS. 1B and 1C which are schematic perspective views of the disk cartridge in operative states with its sides "A" and "B" respectively presented for recording or reproduction and with its shutter held in the open position. The cassette has two major opposite surfaces, one of which is referred to as side "A" while the other is referred to as side "B" in this specification.

As will be seen from FIGS. 1A, 1B and 1C, the disk cartridge generally designated by reference numeral 150 has a rectangular thin box-like housing 152 which accommodates an information recording medium which is, in this case, a disk. In FIGS. 1B and 1C, the surfaces of the housing 152 corresponding to the side "A" and the side "B" are represented, respectively, by 154a and 154b. Apertures 156a and 156b are formed in the surfaces 154a and 154b, respectively, of the housing 152.

The conventional disk cartridge 150 is provided with a shutter 158 which is slidable on the cartridge housing 152. As will be seen from FIG. 1A, the shutter 158 closes the apertures 156a and 156b when the cartridge is not used. When the cartridge 150 is used with its side "A" presented for recording or reproduction, the shutter 158 is moved to the position illustrated in FIG. 1B so as to open the aperture 156a. Conversely, when the side "B" is used, the shutter 158 is moved to the position illustrated in FIG. 1C so as to open the aperture 156b.

Thus, in this known disk cartridge, the direction of movement of the shutter 158 relative to the side "A" of the disk cartridge is the same as that of the shutter 158 relative to the side "B". In other words, the shutter 158 is required to move both to the right and left sides of the central closing position with respect to the housing 152 of the disk cartridge.

This inevitably limits the size of the aperture on each side of the housing 152 and requires a complicated mechanism for driving the shutter.

In particular, when an opto-magnetic disk is used as the recording medium, the disk cartridge is required to have a space large enough to accommodate a biasing magnet. Unfortunately, however, it is very difficult to obtain such a space in the conventional disk cartridge having the illustrated construction.

FIGS. 2A, 2B and 2C show a disk cartridge which also has been known, but improved to obviate the described shortcoming of the disk cartridge shown in FIGS. 1A, 1B and 1C. The disk cartridge, which is generally designated at 8, has a cartridge housing 8 and a shutter 82 which is slidable on the cartridge housing 9. When the disk cartridge 8 is not used, the shutter 82 is placed at a central shut-off position as shown in FIG. 2A. When the side "A" or the side "B" of the disk cartridge is presented for use, the shutter 82 is set at positions shown in FIG. 2B or 2C so as to allow the aperture 22a or 22b to open. It will be understood that the direction of movement of the shutter 82 with respect to the cartridge housing 8 from the central closing position shown in FIG. 2A to the opening positions shown in FIGS. 2A and 2B is the same, regardless of whether the side "A" or the side "B" is used. It will be understood that this arrangement enables the disk cartridge 8 to be designed to have an ample area of each aperture 22a, 22b.

The disk cartridge of the type shown in FIGS. 2A to 2C has been used, for instance, together with a flexible magnetic disk, and has been designed such that the shutter is automatically moved from the shut-off position and the open position in response to the action for inserting and ejecting the disk cartridge. For instance, Japanese Utility Model Laid-Open No. 101355/1983 discloses a swingable lever which is adapted to be actuated in response to the action for inserting or ejecting the disk cartridge and engageable with the shutter so as to open and close the shutter. Usually, this type of disk cartridge is used in an apparatus which is provided with independent recording/reproducing heads disposed on both sides of the disk and adapted for conducting recording and reproduction on the side "A" and the side "B" of the disk. This means that the disk cartridge 8 need not be inverted and the recording and reproduction on both sides of the disk are possible with the constant orientation, e.g., with the side A directed upward, of the cartridge.

In some cases, however, it is not advantageous that a single apparatus has two sets of recording/reproducing heads which are intended for conducting recording/reproducing on the respective sides of the disk. This is true, particularly in the case of an optical recording/reproducing apparatus, because such a type of apparatus employs a large-size and expensive optical head. Provision of a pair of such optical heads will raise the cost of the apparatus and will make it difficult to reduce the thickness of the apparatus.

The most practical method for overcoming such a problem is to invert the disk cartridge depending on the side to be used. In such a case, however, the shutter has to be moved with respect to the cartridge in different directions, depending on the side of the cartridge to be used.

For instance, if the disk cartridge is designed such that the shutter 82 is moved to the right with respect to the cartridge housing when the side "A" denoted by reference numeral 10a is presented for use as viewed in FIG. 2B, the shutter 82 has to be moved to the left with respect to the cartridge housing as viewed in FIG. 2C. Unfortunately, the known shutter operating mechanism disclosed in Japanese Utility Model Laid-Open No. 101355/1983 could not meet such a demand.

SUMMARY OF THE INVENTION

Accordingly, an object of the present invention is to provide an information recording/reproducing apparatus provided with a simple yet reliable shutter actuating mechanism which is capable of moving a shutter of a double-sided disk cartridge in different directions depending on which of two sides of the disk cartridge is presented for recording or reproduction.

According to one aspect of the invention, there is provided, in an information recording/reproducing apparatus of the type which is loadable with a cartridge containing an information recording medium and a slidable shutter, and which conducts at least one of recording and reproduction of information in and from the recording medium, the combination of a cartridge loading mechanism and a pair of levers. The cartridge loading mechanism is arranged for inserting and ejecting a cartridge along a given path into and out from a holder in the apparatus. The levers are mounted to swing in symmetry with respect to the direction of insertion of the cartridge with a free end of the levers being arranged for engagement with the shutter of a cartridge inserted into the apparatus to move the shutter in opposite directions in response to the insertion and ejection, respectively, of the cartridge.

According to a further aspect of the invention, there is provided, in an information recording/reproducing apparatus of the type which is loadable with a cartridge containing an information recording medium and a slidable shutter, and which conducts at least one of recording and reproduction of information in and from the recording medium, the combination of a cartridge loading mechanism, a first swingable lever, a second swingable lever and a biasing means. The cartridge loading mechanism is arranged for inserting and ejecting a cartridge along a given path into and out from a holder in the apparatus. The first swingable lever is mounted to swing in first and second swinging directions in response to the insertion and ejection, respectively, of a cartridge for opening and closing the cartridge shutter. The second swingable lever is carried by a free end of the first swingable lever for swinging in directions opposite to the first and second swinging directions of the first lever. The second lever has a free end engageable with an engaging portion on the cartridge shutter and is adapted to prevent swinging of the second lever relative to the cartridge upon engagement with the engaging portion. The biasing means is arranged for applying a biasing force to the second lever in the first swinging direction of the first swingable lever.

These and other objects, features and advantages of the present invention will become clear from the following description of the preferred embodiment taken in conjunction with the accompanying drawings.

DESCRIPTION OF THE PREFERRED EMBODIMENT

A preferred embodiment of the present invention will be described hereinunder with reference to the accompanying drawings.

Figure 1A:
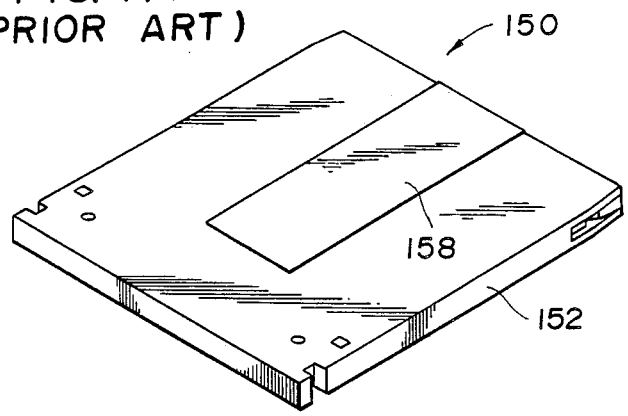
FIGS. 1A to 1C and FIGS. 2A to 2C are perspective views of different types of known disk cartridges.
Figure 1B:
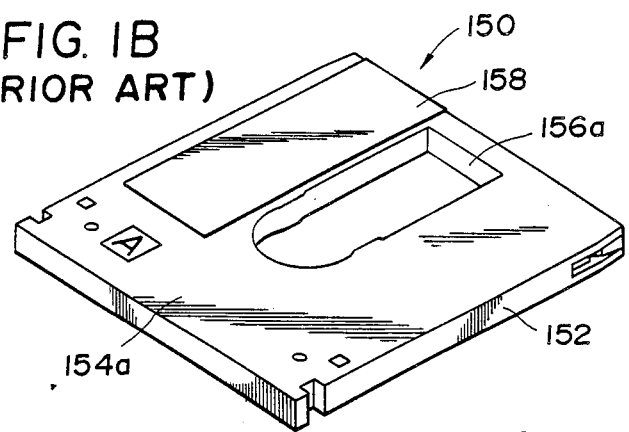
Figure 1C:
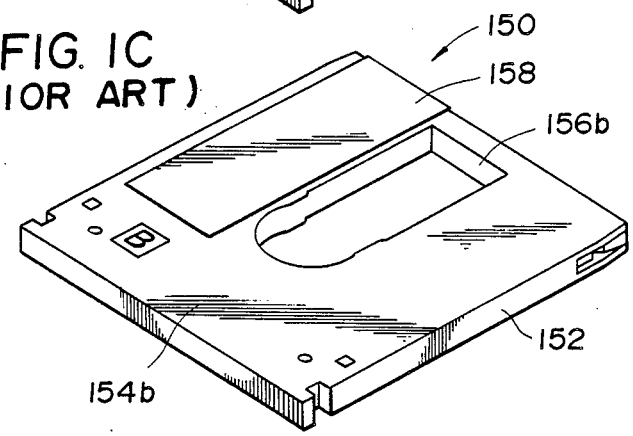
Figure 2A:
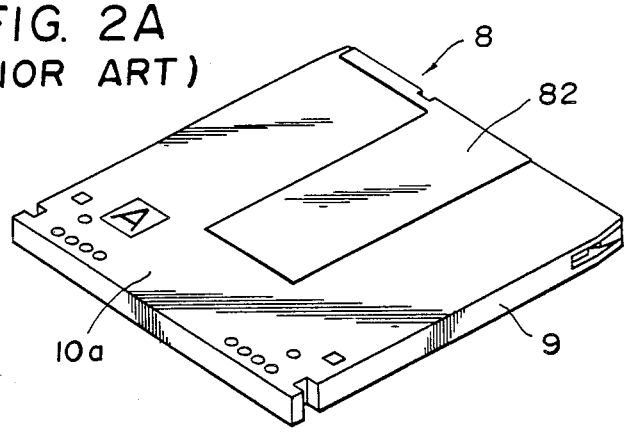
Figure 2B:
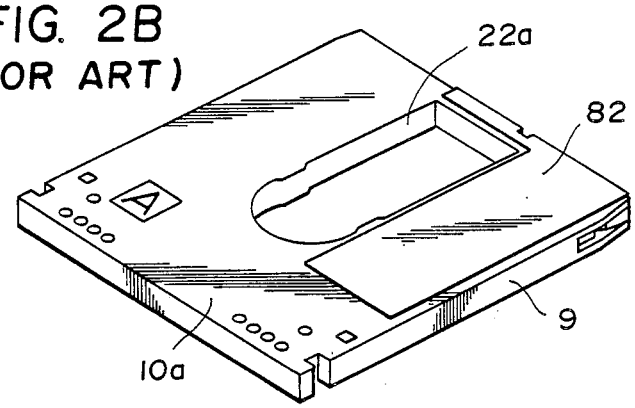
Figure 2C:
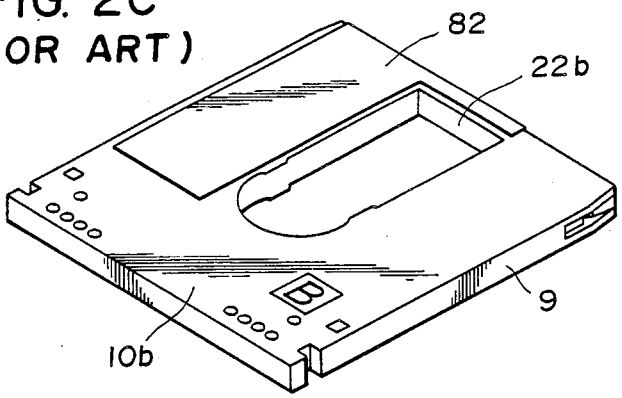
Figure 3:
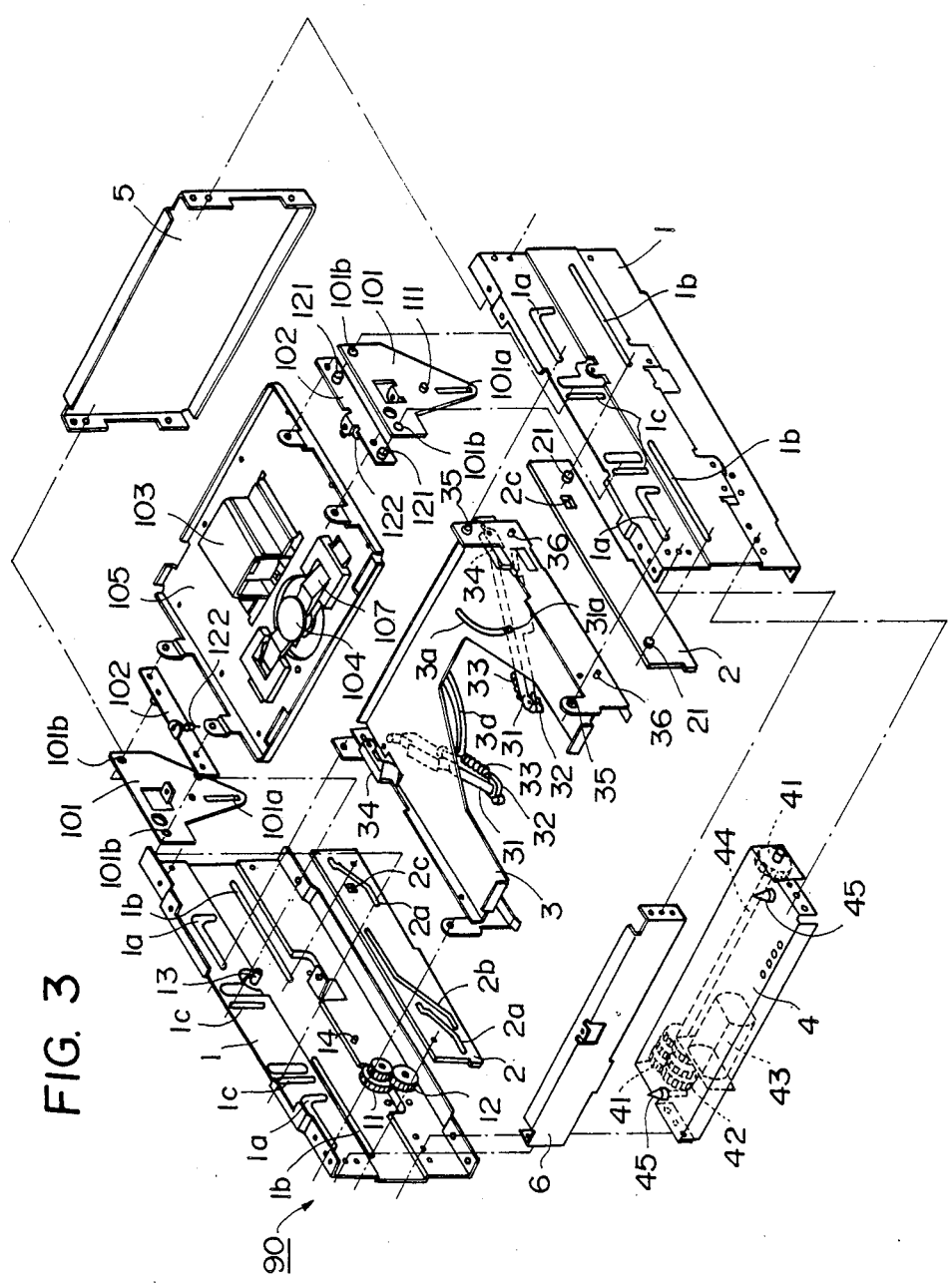
FIG. 3 is an exploded perspective view of an embodiment of information recording/reproducing apparatus embodying the present invention.

Referring to FIG. 3, an opto-magnetic disk apparatus, as an embodiment of the information recording/reproducing apparatus of the present invention, is shown in an exploded perspective view and is generally designated by reference numeral 90. The opto-magnetic disk apparatus 90 includes a cartridge holder mechanism which holds a cartridge and is designed to perform various actions including opening and closing of the shutter, a clamper mechanism having a disk clamper 104 and a biasing magnet 103, a driving mechanism including a driving motor 43, a reduction gear train 42 and synchronizing gears 41, and a loading mechanism composed of cam racks and a driving pinion gear and capable of actuating the cartridge holder mechanism and the clamper mechanism between a loading start position at which the loading is commenced and a recording/reproduction position at which the disk in the disk cartridge is accessed for the purpose of recording or reproduction.

Each of the mechanism portions mentioned above will be described hereinunder.

Referring again to FIG. 3, the cartridge holder mechanism portion includes a cartridge holder body 3 and a pair of first shutter levers 31 which are pivotable about respective fulcrums provided on the underside of the cartridge holder body 3. The first shutter levers 31 carry pins 31a which engage with guide grooves 3a formed in the wall of the cartridge holder body 3. The first shutter levers 31 are biased forward by means of springs (not shown) so as to keep the shutter levers 31 in the initial position as shown in FIG. 3. Second shutter levers 32 are pivotally secured to the respective shutter levers 31 for pivotal movement about fulcrums carried by the first shutter levers 31. The second shutter levers 32 are biased by springs 33 so as to be kept in initial positions as shown in FIG. 3. The cartridge holder mechanism portion further has holder stoppers 34 which are swingable about fulcrums provided on inner upright portions of the cartridge holder body 3. The holder stoppers 34 are set at positions shown in FIG. 3. Stepped rollers 35 are rotatably carried by pins secured to outer upright portions of the cartridge holder body 3.

Referring now to the clamper mechanism, this mechanism has a clamp base 105 and a biasing magnet 103 provided on the clamper base 105. The clamper mechanism also has a clamper 104 which is urged upward to an initial position as shown in FIG. 3 by means of a pair of levers 107 which are vertically swingable and spring-biased upward. Sliders 102 are secured to both sides of the clamp base 105. Each slider 102 has pins 121 which are received in holes 101b formed in a cooperating slider 101. Since the clamp base 105 is urged by springs 122, the pins 121 are held at reference positions where they contact the lower edges of the holes 101b.

Referring now to the driving mechanism, a driving motor 43 and a reduction gear train 42 having five gears are secured to a frame 4. The gear constituting the final stage of the reduction gear train 42 meshes with one of two synchronizing gears 41. Both synchronizing gears are fixed to a common shaft 44 so that they are driven synchronously. Two of the gears constituting the reduction gear train 42 in the illustrated embodiment are shown to be rotatably carried by the shaft 44.

Referring now to the loading mechanism, a pair of driving gears 11 including a large gear and a small gear are secured to pins provided on each side panel of the apparatus. The small gear engages with an idler gear 12 which also is secured to a side panel 1. The idler gear 12 engages and is driven by one of the synchronizing gears 41. The large gear of the driving gear pair 11 is engaged by a rack gear portion (not shown) of a cam rack 2 which is in guided mutual engagement between pins 21 provided thereon and mating elongated slots 1b formed in each side panel 1.

Each of the aforementioned stepped rollers 35 engage with an L-shaped hole 1a formed in each side panel 1 so as to guide the cartridge holder body 3 during movement of the cartridge holder body 3. The clamp base 105 is guided by engagement between pins 121 and elongated holes 1c formed in the side panels 1. The cam racks 2 have guide grooves 2a which receive pins 36 on the cartridge holder body 3 and guide grooves 2b which receive pins 111 on the slider 101. Pins 14 on the side panels 1 are received in elongated holes 101a in the sliders 101 so as to guide the sliders 101 when the latter are moved.

The idler gears 12 mesh with synchronizing gears 41 of the driving mechanism.

The frame 4 is provided on the upper side thereof with a pair of pins 45 which are adapted to locate the cartridge when the disk cartridge is loaded on the apparatus.

Figure 4A:
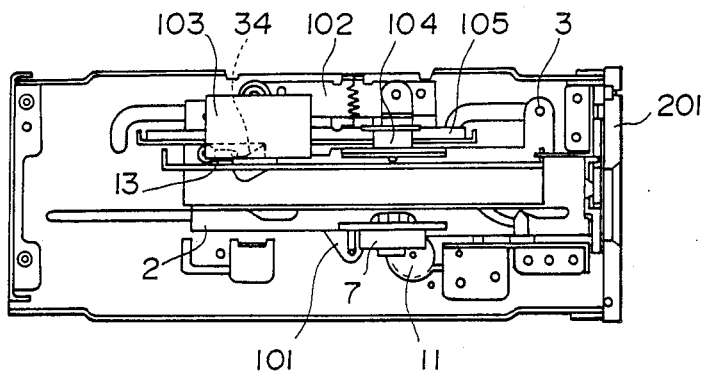
FIGS. 4A to 4C are sectional side elevational views of the information recording/reproducing apparatus in accordance with the present invention.
Figure 4B:
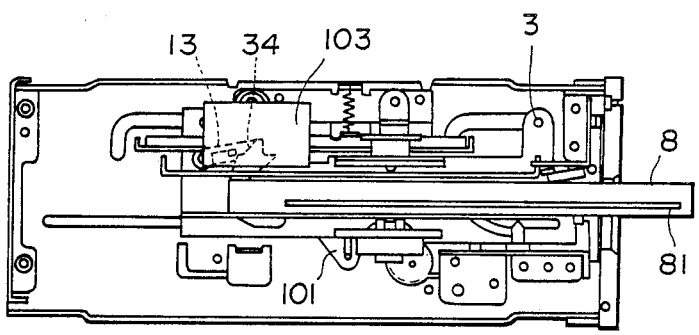
Figure 4C:
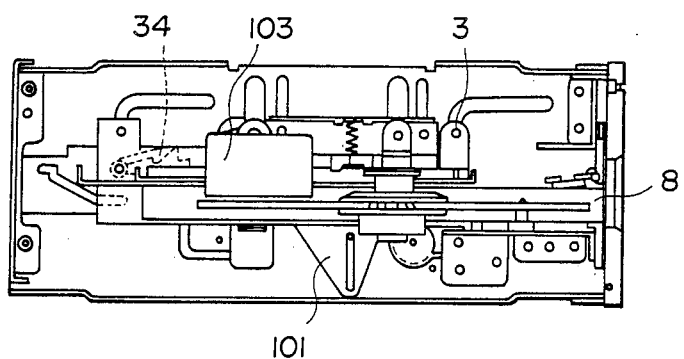
Figure 5A:
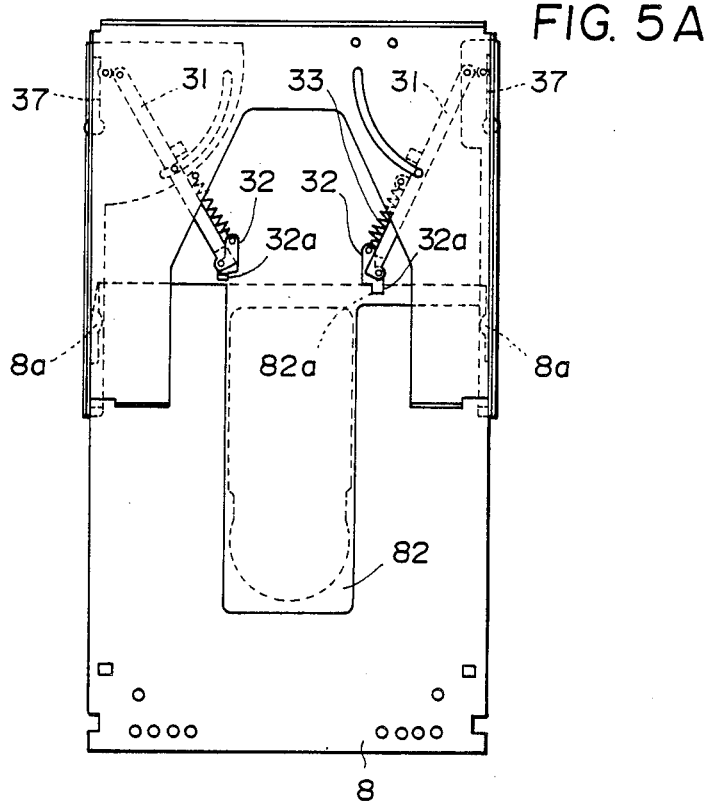
FIGS. 5A and 5B are plan views of a cartridge holder which is held in the position illustrated in FIG. 3.
Figure 5B:
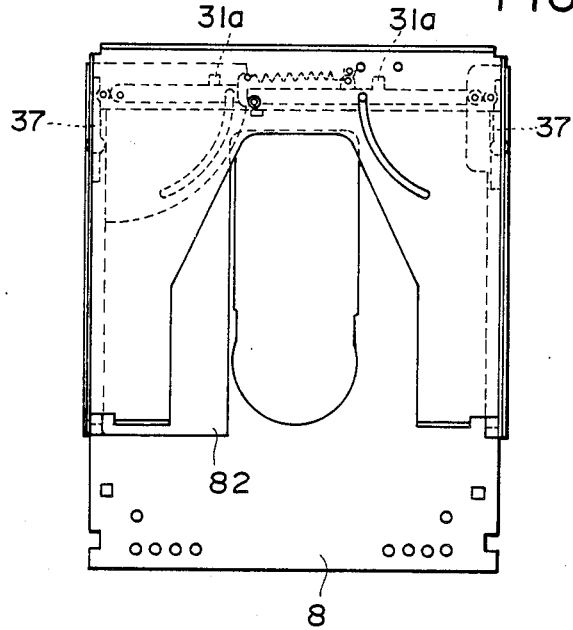

The operation of the apparatus will be described hereinunder, with specific reference to FIGS. 4A, 4B and 4C and FIGS. 5A and 5B. FIGS. 4A, 4B and 4C are sectional side elevational views of the apparatus shown in FIG. 3 in different states of operation: namely, in a state in which the disk cartridge is not inserted, in a state in which the disk cartridge is being loaded and in a state in which the disk cartridge has been loaded and the disk in the cartridge has been clamped. FIGS. 5A and 5B are plan views of the cartridge holder in a state in which the disk cartridge is being loaded and a state in which the disk cartridge has been fully inserted, respectively.

Referring to FIG. 4A, the parts of the apparatus are in the initial positions which are the same as those illustrated in FIG. 3. In this state, the position of the cartridge holder body 3 is limited by engagement between hooked portions of the holder stoppers 34 and the pins 13 on the side panels 1. The disk cartridge 8 is inserted through a cartridge insertion opening formed in a front panel 201. When the cartridge has reached a position shown in FIG. 5A, the end 32a of one of the shutter levers 32 which is on the right side as viewed in FIG. 5A is caught by a notch 82a formed in a shutter 82 of the disk cartridge 8. Since there is no other notch in the shutter 82, the end 32a of the other shutter lever 32 which is on the left side of this figure abuts the edge of the disk cartridge 8 so that the first shutter lever 31 associated with this shutter lever 32 is held at a position where it has been slightly rotated counter-clockwise. As the cartridge 8 is moved deeper into the apparatus, the first shutter levers 31 on the right and left sides of FIG. 5A are swung clockwise and counterclockwise, respectively, to positions shown in FIG. 5B. During movement of the cartridge 8 from the position shown in FIG. 5A to the position shown in FIG. 5B, the second shutter lever 32 pivotally mounted on the right first shutter lever 31 acts to cause a leftward movement of the shutter 82 as viewed in FIGS. 5A and 5B.

As will be seen from FIG. 3, the pair of first shutter levers 31 are arranged in symmetry with respect to the line along which the center of the cartridge 8 is moved during insertion, and are constructed such that they clear each other at positions where they cross each other and are parallel to each other when the cartridge 8 is in the loaded position. That is, both first shutter levers are offset from each other in the direction perpendicular to the plane of their swinging movement and to the plane of a disk held by the cartridge inserted into the apparatus. Thus, as can be seen from the drawings, when a cartridge 8 is inserted with its shutter 82 on top, the shutter notch 82a is engaged by the end 32a of the shutter lever 32 mounted on the lever 31 on the right hand side of the mechanism shown in FIG. 5A; and when a cartridge 8 is inserted in an inverted position, i.e., with its shutter 82 underneath, the shutter notch 82a is engaged by the end 32a of the shutter lever 32 mounted on the lever 31 at the left hand side of the mechanism shown in FIG. 5A.

Figure 6A:
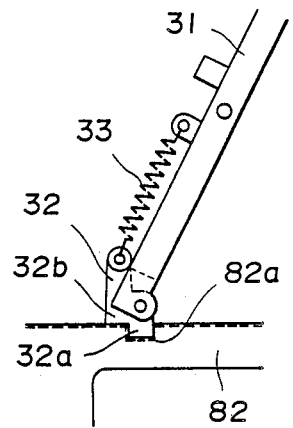
FIGS. 6A and 6B are illustrations of operation of a shutter lever incorporated in the apparatus shown in FIG. 3.
Figure 6B:
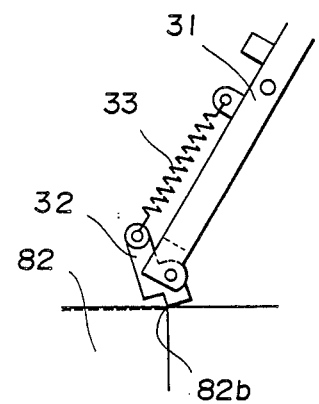
Figure 7A:
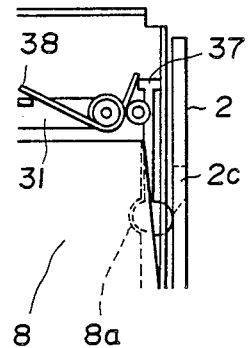
FIGS. 7A and 7B are illustrations of a cartridge stopper of the apparatus shown in FIG. 3.

Operation of each portion of the apparatus will be explained in more detail with reference to FIGS. 6A and 6B which are illustrative of the operation of the shutter levers and also to FIGS. 7A and 7B which are illustrative of the operation of the cartridge stoppers.

As stated before, the second shutter lever 32 on the operative first shutter lever 31 which is, in this case, the first shutter lever 31 shown on the right part of FIGS. 5A and 5B, is initially set at the position shown in FIG. 3 by the force of the spring 33. As the cartridge 8 is moved to bring the notch 82a in the shutter 82 thereof into engagement with the extreme end 32a of the shutter lever 32, the shoulder portion 32b on the end of the lever 32 file on the edge of the notch 82a so as to prevent any further movement of the lever 32 and to prevent the shutter lever 32 from coming off the notch 82a in the shutter 82. In contrast, if the portion of the edge 82b of the shutter has no notch, as shown in FIG. 6B, the shutter lever 32 is allowed to swing counterclockwise to clear the edge 82b.

Figure 7B:
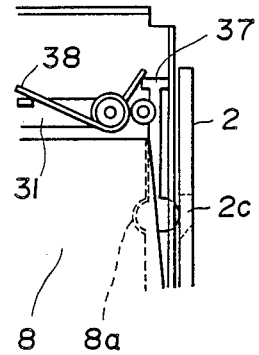

When the disk cartridge 8 has been moved into the position shown in FIG. 5B, it is urged by the cartridge stoppers 37 urged by the springs 38, as will be understood from FIG. 7B. In this state, the cartridge 8 is still detachable, because the locking force exerted by the springs 38 is not so strong.

When the cartridge 8 has been fully inserted as shown in FIG. 5B, the hooked portion of each holder stopper 34 is disengaged from the associated pin 13 on the side panel 1 (FIGS. 3 and 4C), so that the cartridge is movable horizontally.

When the state shown in FIG. 5B is attained, a projection 31a on the shutter lever 31 is detected by a photo-interrupter (not shown). The photo-interrupter produces a signal for allowing the driving motor 43 (see FIG. 3) to start, so that the power of the motor 43 is transmitted to the cam racks 2 through the reduction gear train 42, synchronizing gears 41, idler gears 12 and the driving gears 11, so as to cause the cam racks 2 to move rearward. When the cam racks 2 have been moved to the position shown in FIG. 7A, an R-shaped projection on each cartridge stopper 37 is disengaged from a tapered hole 2c in each cam rack 2, so that the movement of the cartridge stopper 37 is limited, whereby the disk cartridge 8 is fixed to the cartridge holder body 3. In this state, the cartridge holder body 3 is not allowed to move.

As the cam racks 2 further move rearward, the cartridge holder body 3 is first moved horizontally and then moved downward so as to be fixed at a lowered position, by virtue of the presence of the L-shaped holes in the side panels 1 and guide grooves 2a in the cam racks 2 (FIG. 3). Meanwhile, the clamp base 105 is moved downward by virtue of the elongated holes 1c in the side panels 1 and the guide grooves 2b in the cam racks 2.

The stroke and timing of movement of the clamp base 105 are determined independently of the movement of the cartridge holder body 3. Since the clamp base 105 is urged by springs 122 through the sliders 101, the sliders 101 are moved downward even after the clamp base 105 is stopped by the cartridge holder body 3, until they are set in predetermined lowered positions.

It will be clear to those skilled in the art that an operation for ejecting the disk cartridge 8 can be conducted by following a procedure which is reverse to that described hereinbefore.

In the described embodiment of the invention, the operation for opening and closing the shutter of the disk cartridge is effected by swingable levers, so that ample spaces are formed on the upper and lower sides of the shutter of the disk cartridge in the loaded position. Each of these spaces can effectively be used for accommodating, for example, a biasing magnet as in the case of the illustrated embodiment.

Although a specific embodiment has been described, various changes and modifications may be imparted to the described embodiment. For instance, the first shutter levers may be arranged to extend from positions outside the cartridge holder body to positions where they are engageable with the shutter of the cartridge, although in the described embodiment these first shutter levers are carried by the cartridge holder body. Furthermore, the illustrated embodiment can easily be modified to adapt to different types of recording medium such as optical disks and magnetic disks, although an opto-magnetic disk apparatus has been specifically described. Furthermore, the invention is applicable to information recording/reproducing apparatus which employ recording mediums other than disks, e.g., cards and tapes, provided that the recording medium is accommodated by a cartridge provided with a slidable shutter adapted to be opened and closed in response to the action for loading and unloading such a cartridge.

What is claimed is:

1. An information recording/reproducing apparatus which is loadable with a cartridge including an information recording medium and a slidable cartridge shutter, and which performs at least one of recording and reproduction of information in and from the recording medium, said apparatus comprising:
    a cartridge loading mechanism for inserting and ejecting the cartridge along a given path into and out from a holder in said apparatus;
    a first swingable lever for swinging in first and second swinging directions in response to insertion and ejection, respectively, of the cartridge, for opening and closing the cartridge shutter;
    a second swingable lever carried by a free end of said first swingable lever for swinging in directions opposite to the first and second swinging directions of said first swingable lever, a free end of said second swingable lever comprising a projection engageable with a notch on the cartridge shutter and an offset shoulder portion stepped from the projection only in the first swinging direction, the shoulder portion preventing said second swingable lever from swinging when the projection is engaged with the notch; and
    biasing means for applying a biasing force to said second swingable lever in the first swinging direction of said first swingable lever.

2. An information recording/reproducing apparatus according to claim 1, further comprising a third swingable lever for swinging in the second and first swinging directions in symmetry with said first swingable lever in a plane parallel to and offset from the plane of swinging movement of said first swingable lever in response to the insertion and ejection, respectively, of a cartridge and a fourth swingable lever carried by the free end of said third swingable lever for swinging in directions opposite to the swinging directions of said third swingable lever, said fourth swingable lever comprising a free end engageable with an engaging portion on the cartridge shutter for preventing swinging of said fourth swingable lever relative to the cartridge upon engagement with the engaging portion; and
    further comprising biasing means for applying a biasing force to said fourth swingable lever in the second swinging direction of said third swingable lever.

3. An information recording/reproducing apparatus according to claim 2, wherein said first and third swingable levers are offset from each other in the direction of their swinging movement and wherein the free ends of said second and fourth swingable levers are engageable with a cartridge shutter when the shutter is on top and underneath the cartridge, respectively.

4. An information recording/reproducing apparatus according to claim 2, wherein the free end of said fourth swingable lever comprises a projection for engaging a notch on the cartridge shutter, the projection preventing swinging of said second swingable lever when engaged at the notch.

5. An information recording/reproducing apparatus according to claim 2, wherein said first and third swingable levers are carried by the holder in said apparatus.

* * * * *